Jan. 10, 1928. 1,655,750
J. A. CAMPO
COUPLING PIN
Filed Jan. 15, 1926 2 Sheets-Sheet 1
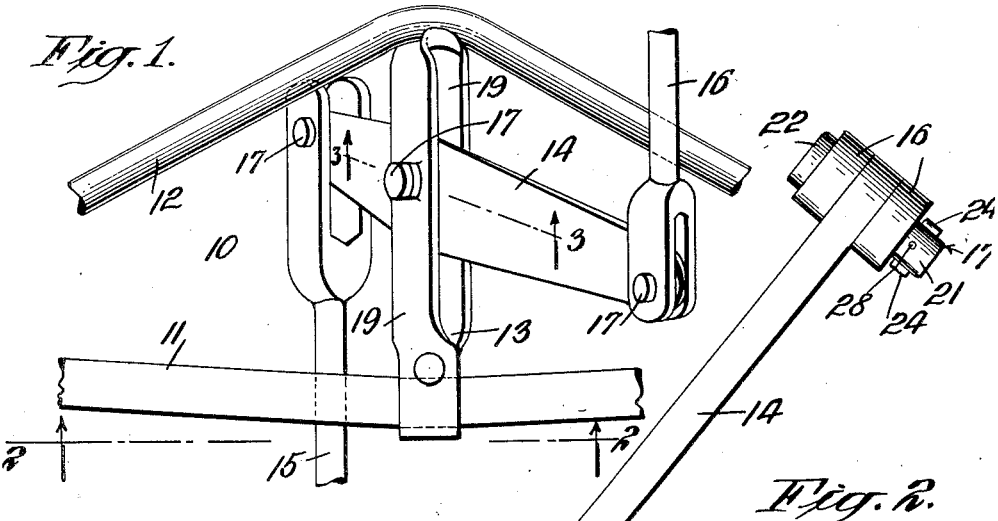
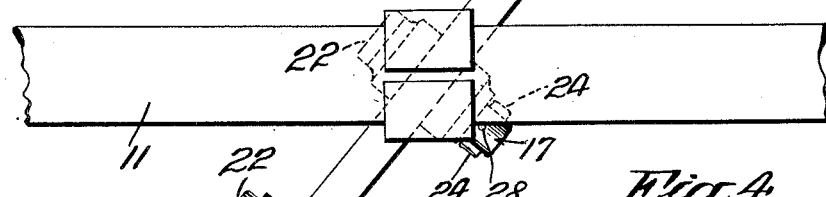
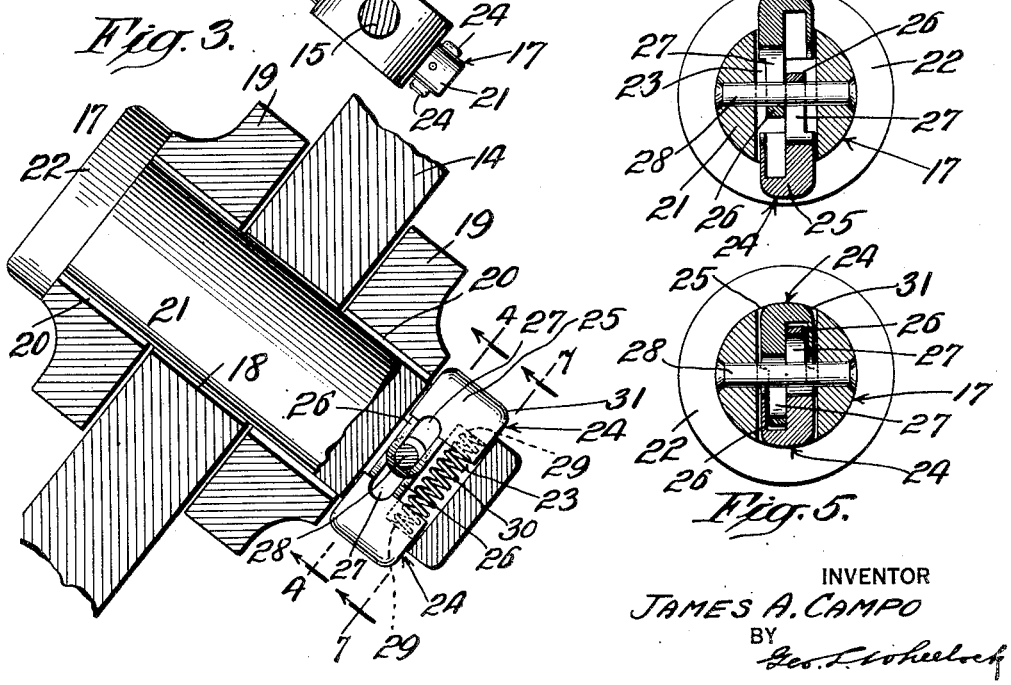
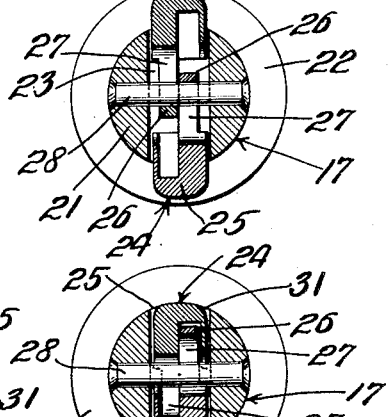
INVENTOR
JAMES A. CAMPO
BY
ATTORNEY

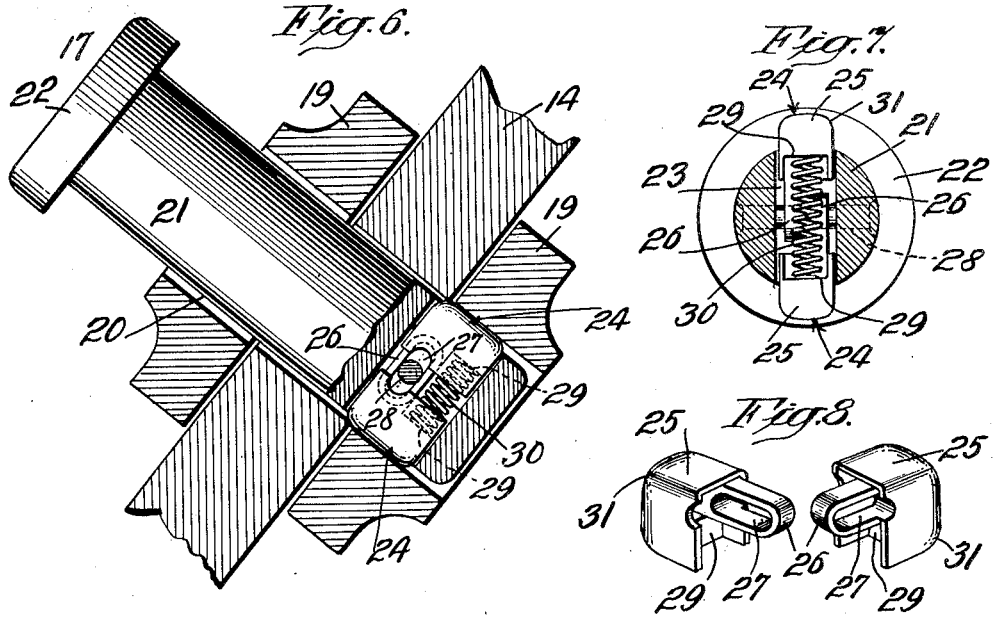
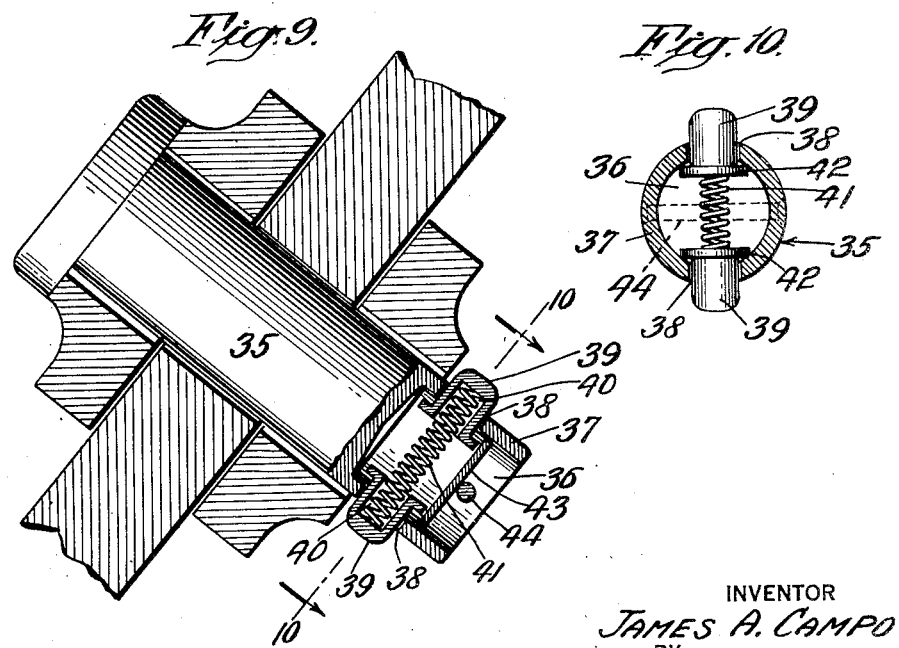

Patented Jan. 10, 1928.

1,655,750

UNITED STATES PATENT OFFICE.

JAMES A. CAMPO, OF WOODRIDGE, NEW JERSEY, ASSIGNOR TO BUFFALO BRAKE BEAM COMPANY, A CORPORATION OF NEW YORK.

COUPLING PIN.

Application filed January 15, 1926. Serial No. 81,365.

This invention relates to improvements in coupling pins and has particular reference to coupling pins for connecting levers, rods, links and the like of mechanisms such as railway brake beams.

Prior to this invention, railway brake beam mechanisms have been connected by means of coupling pins having a cylindrical shank with an enlarged head upon one end and apertured adjacent the other end for the reception of a cotter pin or the like. In use such connecting pins have frequently been accidentally displaced from the mechanism due to the constant jar and vibration to which railroad equipment is subjected, and this has constituted a serious problem for railway engineers. A number of different types of coupling pins have been proposed embodying self-contained keepers which have been permanently connected to the shank of the coupling pin and relatively movable in such a way that the pins could be inserted in the usual apertures of the parts to which they are applied. Some of the coupling pins thus proposed have been difficult to manufacture and consequently expensive, while others have not been capable of easy application to the mechanisms. By the present invention I have overcome the undesirable features of prior art coupling pins and have provided one which should prove to be entirely satisfactory.

An important object of my invention is to provide a coupling pin with self-contained keepers permanently mounted in the pin and manually operable to permit insertion or removal of the pin through openings in parts of brake beam mechanisms to be connected together.

Another object is to provide such a device with novel means for mounting yieldable keepers in the pin shank.

Another object is to provide such a device which will be simple in construction, strong and durable in service, economical to manufacture, and an improvement in the art.

With these and other objects in view, the invention resides in the novel details of construction, combination and arrangement of parts hereinafter set forth and illustrated in the accompanying drawings, and particularly pointed out in the appended claims.

In the drawings forming a part of this application, Figure 1 is a fragmentary top plan view of a railway brake beam mechanism equipped with the improved coupling pins of my invention;

Figure 2 is a longitudinal sectional view on the line 2—2 of Figure 1;

Figure 3 is an enlarged sectional view showing one embodiment of my invention and taken on the line 3—3 of Figure 1;

Figure 4 is a transverse sectional view on the line 4—4 of Figure 3;

Figure 5 is a view similar to Figure 4 showing the yieldable keepers depressed for passage through the opening of part of a mechanism;

Figure 6 is a view similar to Figure 3 showing the coupling pin partly removed from the brake beam mechanism;

Figure 7 is a transverse sectional view on the line 7—7 of Figure 3;

Figure 8 is a detail perspective view of the opposed keepers per se.

Figure 9 is a view similar to Figure 3, illustrating a modified form of coupling pin; and Figure 10 is a transverse sectional view on the line 10—10 of Figure 9.

By way of illustration, I have shown my invention applied to a railway brake beam mechanism wherein the reference character 10 designates a portion of a trussed brake beam, 11 the usual compression member, and 12 the trussed rod. A strut 13 is mounted as usual between the compression member 11 and the trussed rod 12 and pivotally supports the brake lever 14, which has one of its ends pivotally connected to the lower connection rod 15, while its other end is attached to a power rod 16. My improved coupling pins 17 may preferably form the connection between these parts in each instance, and, as best shown in Figure 3, the brake lever 14 is provided with a pinhole 18 for the reception of one of said pins. The strut 13 preferably comprises a pair of spaced parallel side members 19 having aligned openings 20 which support the shank of the coupling pin.

By referring particularly to Figures 3 to 8, inclusive, it will be seen that the pin 17 comprises a shank or body portion 21 which is preferably of cylindrical shape and provided at one end with an enlarged head 22, and adjacent its other end with a transverse opening 23, which in this form of the invention is rectangular in cross-section.

Keepers 24 are oppositely disposed and slidable within the opening 23, each of said keepers comprising a rectangular block 25 having a lateral extension 26 which is slotted, as at 27, for the reception of a stop pin 28 which limits the outward movement of the keepers 24 in the opening 23. The respective extensions 26 preferably overlap one another, as clearly shown in Figures 3 and 4, and are disposed at one side of the cylindrical blocks 25 to provide recesses 29 for the reception of the ends of a coiled compression spring 30, which normally forces the keepers 24 beyond the surface of the body portion 21 of the pin. The exposed edges of the rectangular blocks 25 may preferably be rounded, as at 31, for more convenient manipulation, and the stop pin 28 may preferably be formed from a rivet or the like, which is permanently carried by the shank 21 and extending transversely through the opening 23.

In making a connection with the improved coupling pin of my invention, the opposed keepers 24 are manually depressed to a position within the limits of the sides of the body portion of the pin, whereupon the extremity of the said body portion is inserted within the opening 20 of the first side member 19, and after the keepers have entered the opening 20 the pin 17 may easily be pushed through the remaining distance to its locking position, as illustrated in Figure 3. By virtue of the fact that the rectangular blocks 25 extend a substantial distance beyond the sides of the pin, it will be impossible for the pin 17 to be accidentally displaced from the mechanism. Also it is to be noted that because of the edges of the blocks 25 being rounded, as at 31, there will be no possibility for the keepers to bind within the apertures 18 or 20, particularly at the point where the keeper passes through the aperture of one part to that of another. In order to remove the pin 17 from the mechanism, it is necessary to first manually depress the keepers 24 against the action of the spring 30, so that the outer surfaces of the rectangular blocks 25 may enter the opening 20 of the strut or similar part.

In Figure 9 I have illustrated a modified form of the invention wherein the shank or body portion 35 of the coupling pin is provided with a socket or recess 36 in its extremity, forming an annular wall 37. A pair of diametrically opposed openings 38 are formed in the annular wall 37, and extending from the outer surface of the body portion 35 to the interior of the recess 36 and slidably mounted within the openings 38 are a pair of plungers 39 which function as keepers for the coupling pin. The plungers 39 may preferably be of cylindrical formation and provided with interior sockets 40 for the reception of the ends of a coiled compression spring 41, which normally forces the outer ends of the plungers beyond the outer surface of the body portion 35 of the pin, said outward movement being limited by annular flanges 42 engaging the interior of the sockets 36.

In order to prevent loss of the plungers 39 and the spring 41 in the event that they should be depressed a sufficient distance to pass completely through the annular wall 37, I may close the recesses 36 by means of a plate 43, which is of substantially the same area as the recess 36 and held in place by a rivet or other suitable connecting means 44.

From the foregoing, it will be evident that I have provided a coupling pin of improved and simplified structure, which will be economical to manufacture and easily applied to brake beam mechanisms and the like. Obviously, the invention is susceptible of further modification and the right is herein reserved to make such changes falling within the scope of the appended claims without departing from the spirit of the invention.

Having thus described my invention, what I claim is:

1. A coupling pin of the character described comprising a body portion having a transverse opening adjacent one end, a pair of opposed keepers reciprocable in the opening, said keepers being in the form of rectangular blocks having over-lapping slotted extensions, a spring disposed between the keepers, and a keeper-limiting pin carried by the body portion and extending through the slots of the over-lapping extensions.

2. In a coupling pin of the character described, the combination with a body portion, of a keeper reciprocable transversely within the body portion, said keeper comprising a rectangular block having a slotted extension on its inner edge, and a stop member carried by the body portion of the pin extending into the slotted extension of the keeper, to limit the outward movement of the same, and a spring engaging the keeper beside said slotted extension.

3. A coupling pin for brake beam mechanisms comprising a body portion having a head on one end and a transverse opening adjacent its other end, a pair of rectangular blocks oppositely disposed for sliding movement in said opening, lateral extensions carried by the rectangular blocks, said extensions being slotted and overlapping one another, a stop pin carried by the body portion and extending through the slotted overlapping extensions to limit the outward movement of the rectangular blocks, and a spring disposed between the two blocks to normally force them outwardly beyond the surface of the cylindrical body portion.

JAMES A. CAMPO.